(12) United States Patent
Chang et al.

(10) Patent No.: US 7,122,260 B2
(45) Date of Patent: Oct. 17, 2006

(54) METHOD AND SYSTEM FOR IMPROVING EFFICIENCY OF FUEL CELL IN PORTABLE DEVICES

(75) Inventors: Shung-Huei Chang, Taipei Hsien (TW); Wen-Fa Tseng, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 358 days.

(21) Appl. No.: 10/658,495

(22) Filed: Sep. 8, 2003

(65) Prior Publication Data
US 2005/0053808 A1   Mar. 10, 2005

(51) Int. Cl.
*H01M 8/00* (2006.01)
*H01M 8/04* (2006.01)

(52) U.S. Cl. .......................................... 429/13; 429/26
(58) Field of Classification Search ................ 429/12, 429/13, 26
See application file for complete search history.

(56) References Cited

U.S. PATENT DOCUMENTS

| | | | |
|---|---|---|---|
| RE35,002 E | 7/1995 | Matsubara et al. | 429/12 |
| 5,976,725 A * | 11/1999 | Gamo et al. | 429/25 |
| 6,057,051 A * | 5/2000 | Uchida et al. | 429/19 |
| 6,447,945 B1 * | 9/2002 | Streckert et al. | 429/34 |
| 6,916,568 B1 * | 7/2005 | Guan et al. | 429/26 |
| 2002/0146606 A1 | 10/2002 | Kobayashi et al. | 429/24 |

* cited by examiner

*Primary Examiner*—Patrick Joseph Ryan
*Assistant Examiner*—Thomas H. Parsons
(74) *Attorney, Agent, or Firm*—Ware, Fressola, Van Der Sluys & Adolphson, LLP (57) ABSTRACT

A method of improving the operating efficiency of a fuel cell in a portable device such as a laptop or tablet PC. The efficiency is improved by using the heat produced by the CPU or other components in the PC to heat the liquid methanol for use in the anode part of the fuel cell. Liquid methanol can be heated when it is conveyed from a replenishing unit to the fuel cell via a conduit. The conduit can be embedded in a heat exchanger placed in the proximity of a CPU heat-sink. Alternatively, the conduit is placed near the heat-sink for heating the liquid methanol therein by radiation and convection. Additionally, a fan is used to direct the hot air around the heat sink to heat the liquid methanol in the conduit and to provide heated air to the cathode part of the fuel cell.

22 Claims, 9 Drawing Sheets

METHOD AND SYSTEM FOR IMPROVING EFFICIENCY OF FUEL CELL IN PORTABLE DEVICES

FIELD OF THE INVENTION

The present invention relates generally to the use of fuel cells in portable electronic devices and, more particularly, to the improvement of operating efficiency of fuel cells.

BACKGROUND OF THE INVENTION

Figure 1:
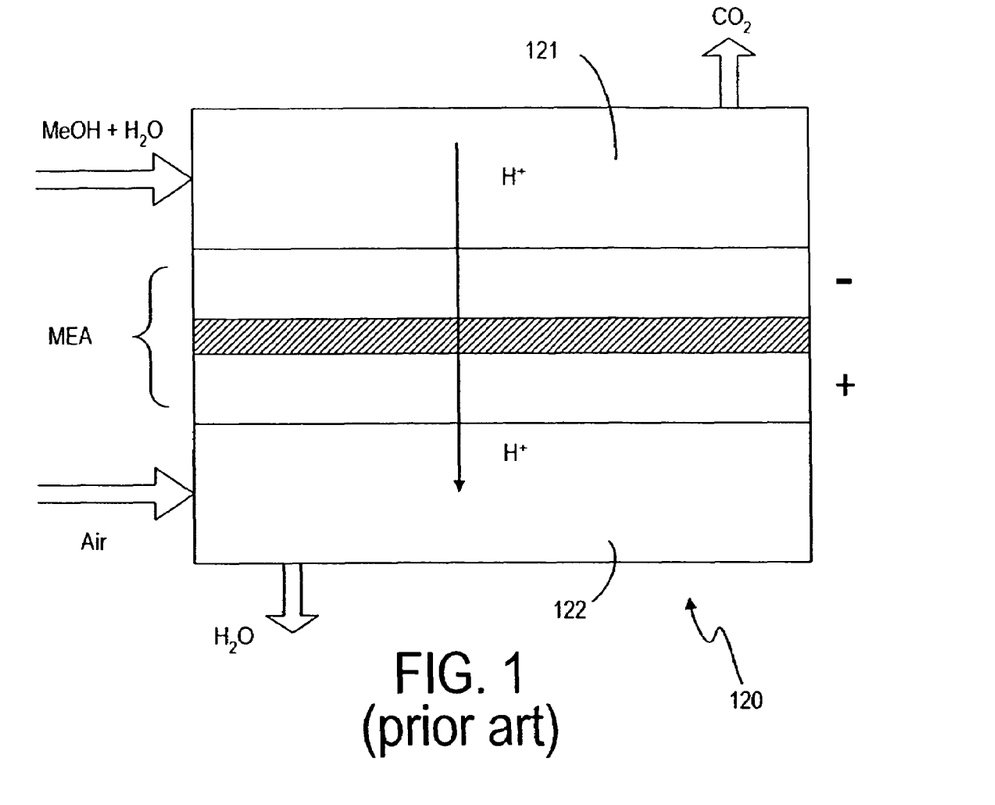
FIG. 1 is a schematic representation showing a direct methanol fuel cell.

A fuel cell works like a battery but does not run down or need recharging so long as the fuel is continually fed to the cell. In a direct methanol fuel cell (DMFC), methanol is used as a fuel, which is put in on one side of the fuel cell while air circulates on the other side. The two sides are separated by a membrane electrode assembly (MEA), which has a proton exchange membrane (PEM) sandwiched between two electrodes. As shown in FIG. 1, a fuel cell 120 includes an anode side 121 where a mixture of methanol (MeOH) and water ($H_2O$) (also referred to as liquid methanol) is circulated around the anode (−). On the cathode side 122, air is circulated around the cathode (+). Through catalytic activation at the MEA, hydrogen atoms from the liquid methanol separate into protons (H+) and electrons (not shown). The electrons become the source of electricity provided by the fuel cell. Some of the protons migrate through to the membrane assembly to the cathode side 122, where they combine with oxygen and become water. While the byproduct of the spent fuel, $CO_2$, on the anode side is easily vented out of the fuel cell, the byproduct, water, on the cathode side must be properly taken away.

A major advantage of fuel cells over rechargeable batteries is that fuel cells can generally operate for longer periods of time without recharging. Furthermore, "recharging" a fuel cell can be accomplished almost instantaneously by refueling with liquid methanol. In contrast, recharging a battery takes hours to complete.

Currently, the operating efficiency of direct methanol fuel cells, in general, is low, especially when the temperature of the fuel falls below a certain range. It is thus advantageous and desirable to increase the temperature of the fuel cell in order to improve the operating efficiency.

SUMMARY OF THE INVENTION

It is a primary objective of the present invention to increase the operating efficiency of a direct methanol fuel cell in a portable device, such as a laptop PC, notebook PC, tablet PC and the like. This objective can be achieved by using the heat generated by the electrical and/or electronic components of the portable device to heat up the liquid methanol for use in the fuel cell or to warm up substantially the entire fuel cell itself.

Thus, according to the first aspect of the present invention, there is provided a method of improving operating efficiency of a fuel cell in a portable electronic device, the fuel cell comprising:

a cell compartment for containing a fuel component; and a fuel activation unit disposed adjacent to the cell compartment for activating the fuel component in order to generate electricity in the portable electronic device. The method comprises the steps of:

heating at least part of the fuel component for providing a heated fuel part; and causing the heated fuel part to engage with the fuel activation unit in the cell compartment for activation.

When the fuel cell further comprises:

a further cell compartment for containing a further fuel component, the further cell compartment disposed adjacent to the fuel activation unit on a different side from the fuel cell compartment, the method further comprises the step of:

heating at least part of the further fuel component for providing a further heated fuel part; and causing the further heated fuel part to engage with fuel activation unit in the further cell compartment.

The fuel component comprises substantially a mixture of alcohol, such as methanol, and water and the further component comprises substantially air. The activation unit comprises a membrane electrode assembly for activating the alcohol in the cell compartment.

Advantageously, the heated fuel part has a temperature substantially in a temperature range of 50° C. to 85° C. or higher, but below the evaporation temperature of the alcohol.

Preferably, the portable electronic device comprises at least one electronic component, such as a CPU, which generates heat, and a heat removal device, such as a heat-sink, disposed in relation to the electronic component for channeling at least part of the heat away from the electronic component, and wherein the heat channeled away by the heat removal device is used in said heating.

Advantageously, the portable electronic device has a replenishing unit for storing the fuel component and conveying the fuel component to the cell compartment in the fuel cell via a fuel conduit, the fuel conduit operatively connecting the replenishing unit and the cell compartment. Preferably, part of the fuel component is heated through the fuel conduit as the fuel component is conveyed to the cell compartment in the fuel cell. Advantageously, at least a part of the fuel conduit is disposed in a heat exchanger, which is disposed in the proximity of the heat removal device so as to allow the heat channeled away by the heat removal device to heat said part of the fuel component in the fuel conduit via the heat exchanger.

Alternatively, the heat exchanger is disposed in contact to the heat removal device so as to allow the heat channeled away by the heat removal device to heat the heat exchanger by way of conduction.

Alternatively, the heat exchanger is placed adjacent to the heat removal device so as to allow the heat channeled away by the heat removal device to heat the heat exchanger by way of radiation or convection.

Advantageously, the method further comprises the step of removing at least a part of the byproduct water away from the further cell compartment by using the heat channeled away by the heat removal device.

According to the second aspect of the present invention, there is provided a fuel cell system for use in a portable electronic device, the portable electronic device comprising at least one electronic component, which generates heat. The fuel cell system comprises:

a fuel cell including:

a first cell compartment for containing a first fuel component;

a second cell compartment for containing a second fuel component; and a membrane electrode assembly disposed between the first cell compartment and the second cell compartment for activating at least one of the first and second fuel components to generate electricity;

a fuel replenishing unit for storing the first component; and a fuel conduit, operatively connecting the fuel replenishing unit and the fuel cell, for conveying the first fuel component from the fuel replenishing unit to the fuel cell, wherein at least part of the fuel conduit is disposed in the proximity of said at least one electronic component so as to allow the heat generated by said at least one electronic component to increase temperature of at least part of the first fuel component while the first fuel component is conveyed in the fuel conduit.

The first fuel component comprises substantially a mixture of alcohol and water, and the second component comprises substantially air.

According to the third aspect of the present invention, there is provided a portable electronic device, which comprises:

a CPU for processing data, the CPU producing heat when it is in use;

a heat removal means disposed in the proximity of the CPU to channel away at least part of the heat produced by the CPU;

a fuel cell for generating electricity for use at least by the CPU, the fuel cell comprising:

a first cell compartment for containing a first fuel component;

a second cell compartment for containing a second fuel component; and a membrane electrode assembly disposed between the first cell compartment and the second fuel cell compartment for activating at least one of the first and second fuel components for said electricity generating;

a fuel replenishing unit for storing said at least one of the first and second fuel components; and a fuel conduit, operatively connecting the fuel replenishing unit and the fuel cell, for conveying said at least said one of the first and second fuel components from the fuel replenishing unit to the fuel cell, wherein at least part of the fuel conduit is disposed in the proximity of the heat removal means so as to allow the heat channeled away by the heat removal means to increase temperature of at least part of said at least one of the first and second fuel components while said at least one of the first and second fuel components is conveyed to the fuel cell.

The present invention will become apparent upon reading the description taken in conjunction with FIGS. 2a to 8.

BEST MODE FOR CARRYING OUT THE INVENTION

As the computational speed of a portable device, such as a laptop PC or a tablet PC, becomes higher, the heat generated by the CPU and other electronic components in the portable device become more problematic. In most portable devices, one or more heat conductive media, such as heat-sinks, are used to take the heat away from the CPU, and a fan or blower is used to vent the heat to the outside of the portable device.

It is known that the operational efficiency of a direct methanol fuel cell (DMFC) depends on the temperature of the fuel cell. The present invention makes use of the unwanted heat to increase the temperature of the liquid methanol and the air to be circulated around the electrodes of the fuel cell. As such, the operating efficiency of the fuel cell can be improved. At the same time, some of the unwanted heat in the portable device is reduced. Furthermore, the hot air around the CPU heat-sink and other electronic components in the portable device can be used to evaporate the byproduct water and to carry the water vapor out of the portable device. This step also helps in reducing the interior temperature of the portable device.

Figure 2A:
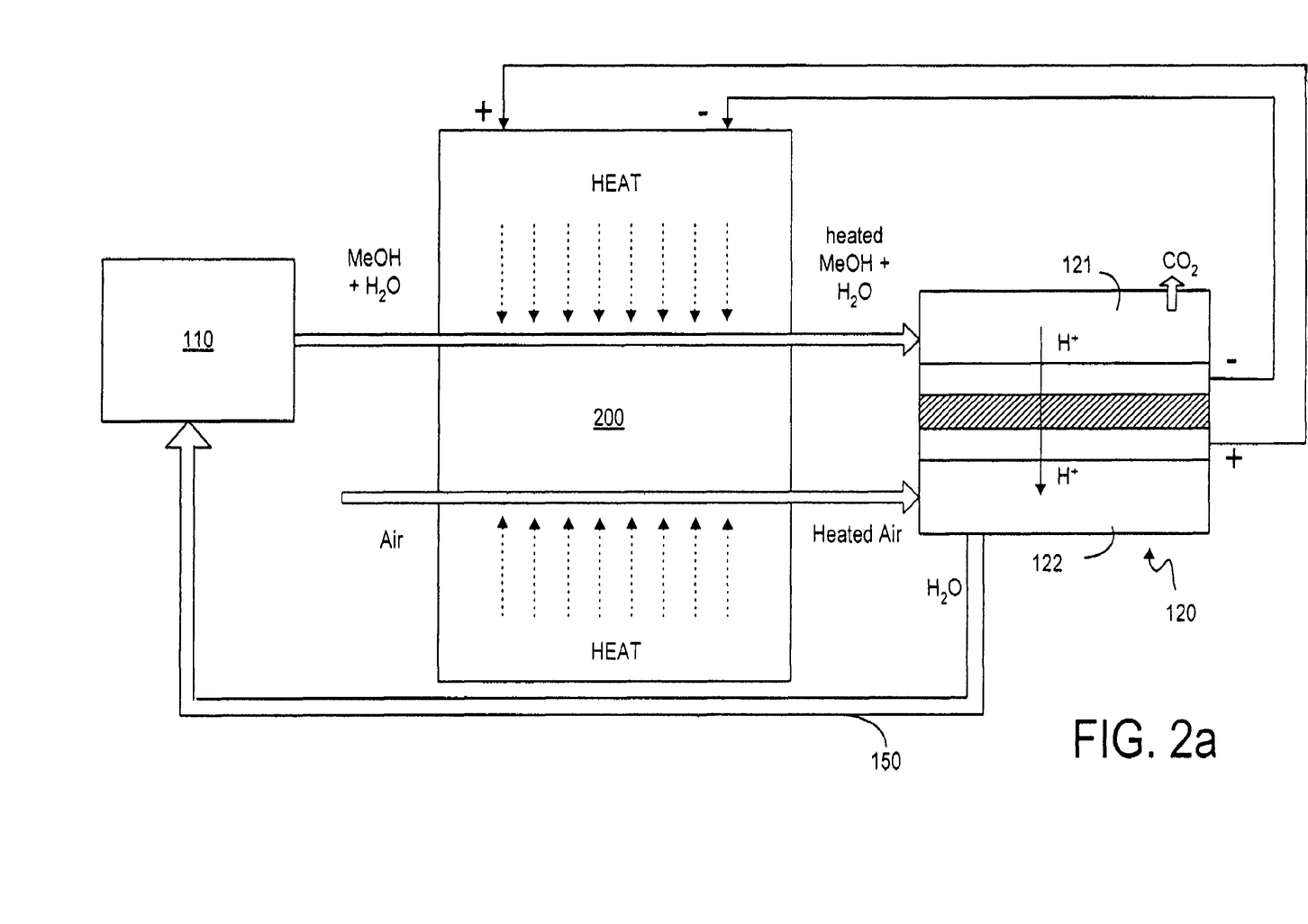
FIG. 2a is a schematic representation illustrating the method of improving the operating efficiency of a DMFC, according to a preferred embodiment of the present invention.

The method of improving the efficiency of a PC fuel cell, according to the present invention, is illustrated in FIG. 2a. As shown in the figure, a fuel replenishing unit 110 is used to feed the liquid methanol (MeOH+$H_2O$) to the anode side 121 of a DMFC 120. The heat generated by a laptop or notebook PC 200 is used to heat the liquid methanol prior to feeding the fuel to the fuel cell 120. In addition, the air for use in circulating around the electrode in the cathode side 122 is also heated by the heat generated by the laptop PC 200. While the byproduct $CO_2$ on the anode side is vented out of the fuel cell 120, the byproduct $H_2O$ on the cathode side is channeled away from the fuel cell 120 to the replenishing unit 110 through a channel 150.

Figure 2B:
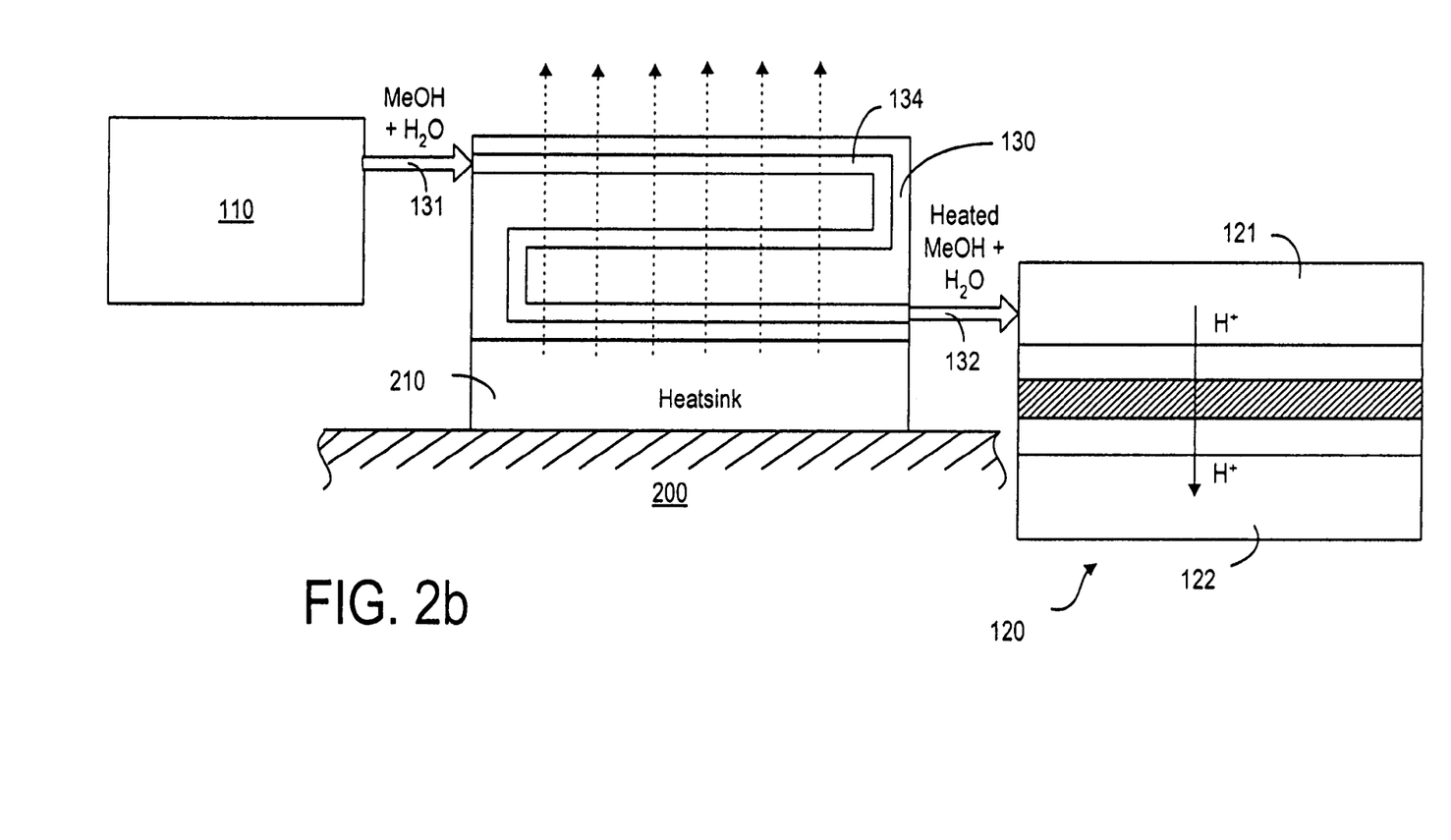
FIG. 2b is a schematic representation illustrating a heat exchanger being used for heating up the liquid methanol, according to the present invention.

In order to use the heat more efficiently, a heat exchanger 130 is used to direct the thermal energy in the heat generated by the laptop PC to the fuel or air channeled through the heat exchanger, as shown in FIG. 2b. Advantageously, the heat exchanger 130 is disposed directly on a heat-sink 210. As shown in FIG. 2b, the liquid methanol is conveyed from the replenishing unit 110 through an input conduit 131 to a channel 134 inside the heat exchanger 130. After it passes through the channel 134 in the heat exchanger 130, the heated liquid methanol is fed to the fuel cell 120 through an output conduit 132. Ideally, the temperature of the heated liquid methanol is substantially in the range of 50–60° C. However, the temperature of the heated liquid methanol can also be above 60° C. but below 90° C.

Figure 3A:
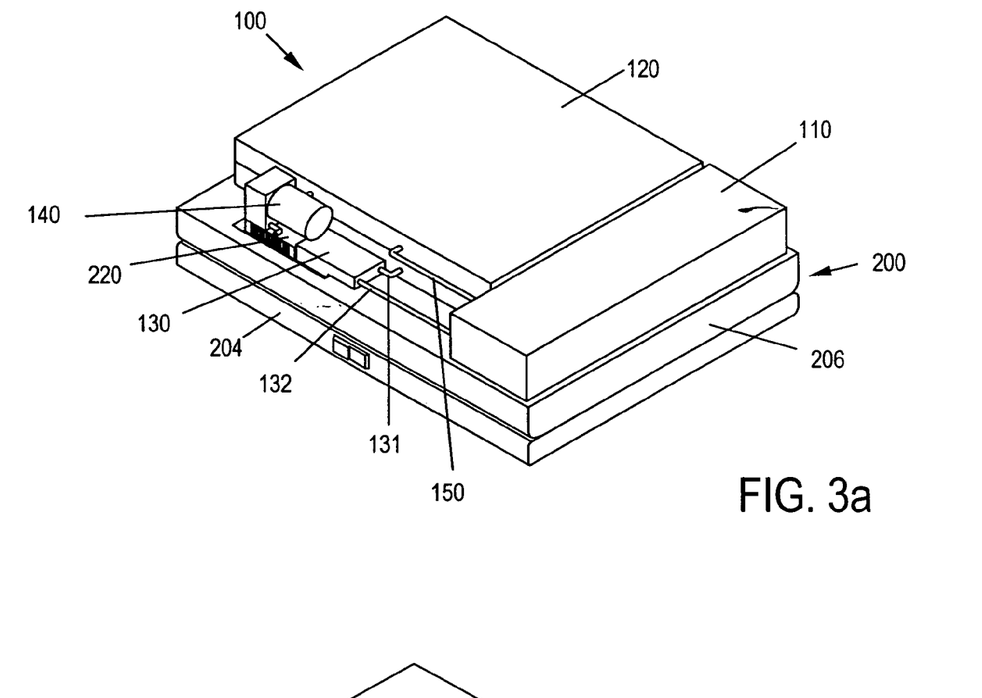
FIG. 3a is a schematic representation illustrating a fuel cell along with a fuel reservoir being disposed on a portable PC.
Figure 3B:
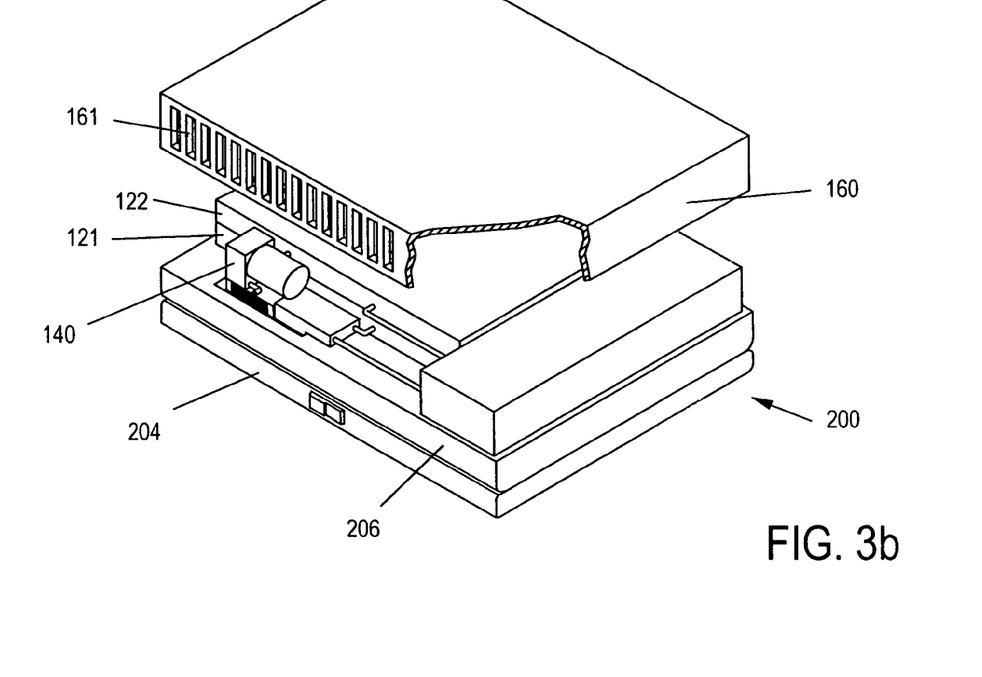
FIG. 3b is a schematic representation illustrating a casing for use in covering the fuel cell assembly.
Figure 3C:
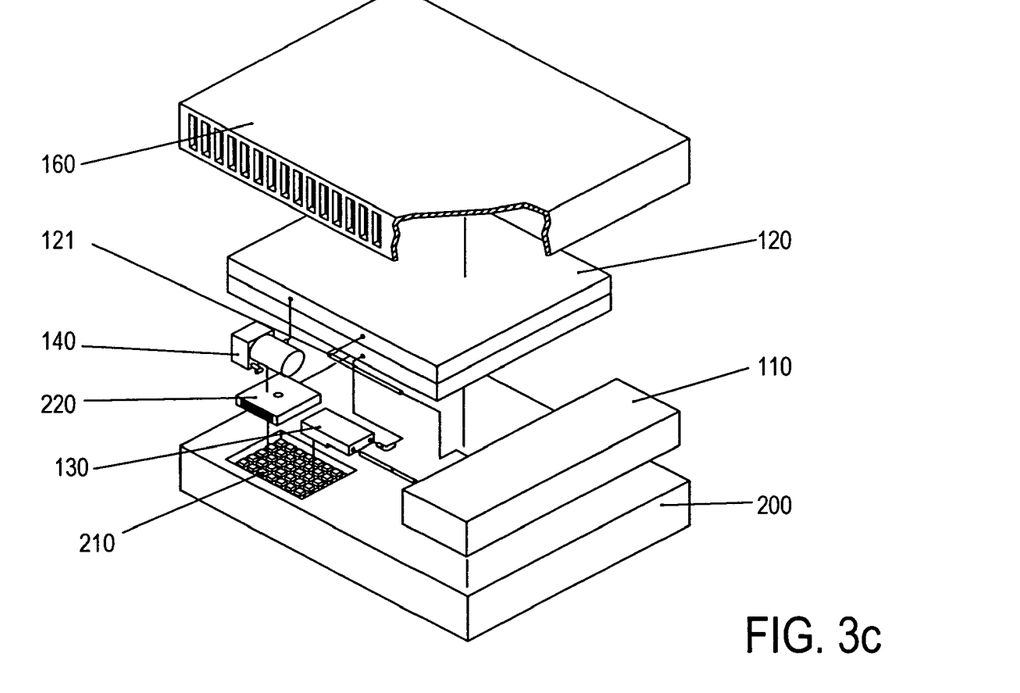
FIG. 3c is an exploded view of the PC/fuel cell assembly.

When the fuel cell 120 is used to provide electrical power to a laptop PC 200, it is preferable to dispose the fuel cell 120 in the proximity of the laptop PC 200, as shown in FIGS. 3*a*–3*d*. Advantageously, the fuel replenishing unit 110 is disposed adjacent to the fuel cell 120. FIGS. 3*a*–3*c* also show other components used in fuel cell module 100 along with the fuel cell 120 and the replenishing unit 110. As shown in FIG. 3*a*, the laptop PC 200 comprises a display section 204 and a data processing section 206. The fuel cell module includes an air pump 140, a fan or blower 220, a heat exchanger 130, and various conduits or channels 131, 132, 150. Advantageously, a protective cover or casing 160 is placed over the fuel cell module 100, as shown in FIG. 3*b*. The casing 160 has a plurality of venting apertures 161 to allow air to circulate around the fuel cell module 100.

Figure 3D:
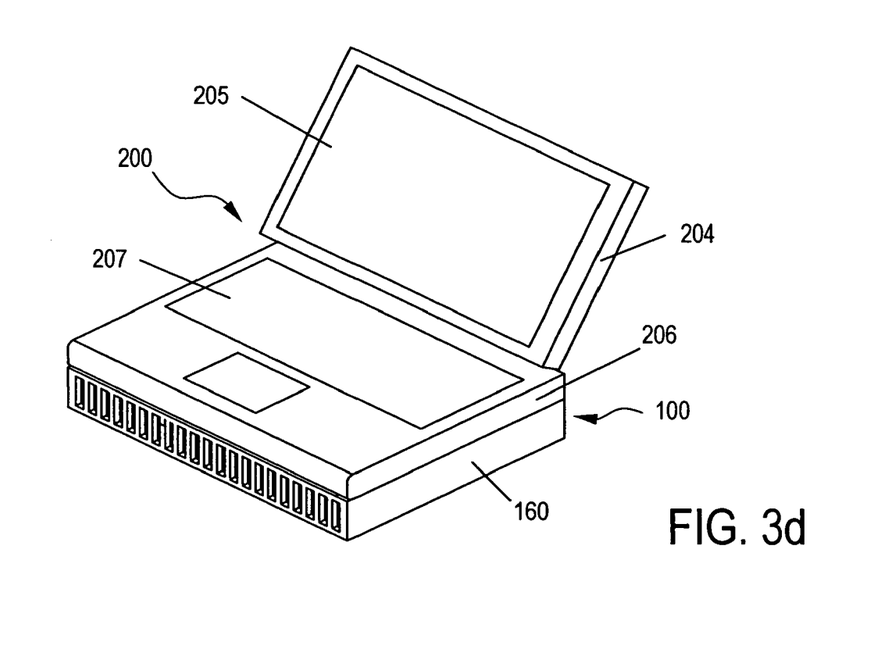
FIG. 3d is a schematic representation illustrating the relative position of the PC and the fuel cell assembly when the PC is in use.
Figure 4:
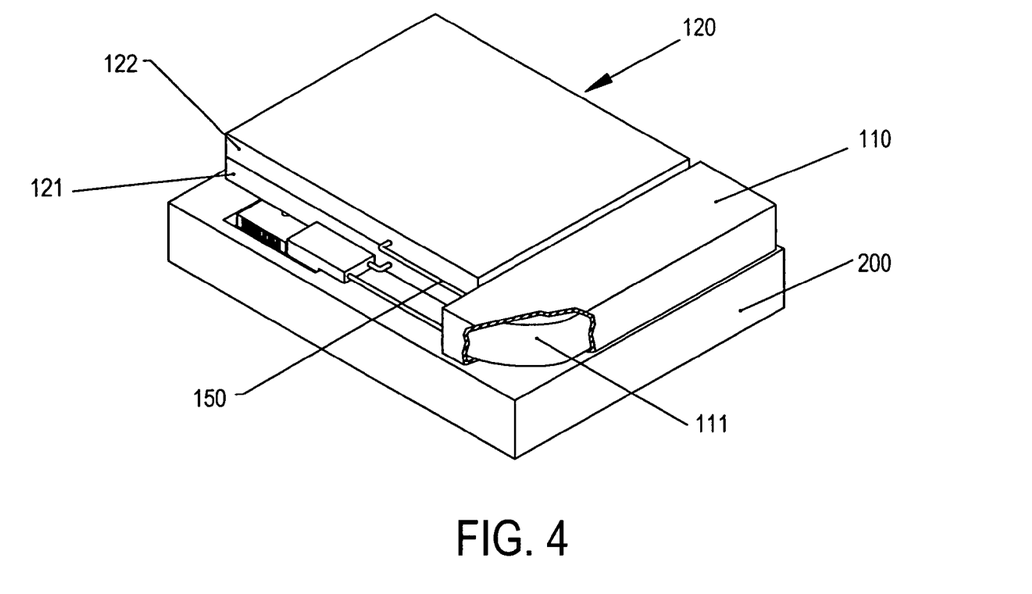
FIG. 4 is a cutout view of the fuel replenishing unit showing a contractible fuel bag.

An exploded view of the laptop PC system of FIG. 3*b* is shown in FIG. 3*c*. As shown in FIG. 3*c*, the fan 220 and part of the heat exchanger 130 are disposed on top of the heat-sink 210 for reducing the temperature in the heat-sink 210. The heat-sink 210 can be placed in contact with the CPU (not shown) in the laptop PC 200, for example. It should be understood that FIGS. 3*a*–3*c* are used to illustrate the position of fuel cell module 100 and its components in relation to the laptop PC 200. In FIGS. 3*a* and 3*b*, the display section 204 appears to be under the data processing section 206. When the laptop PC 200 is in use, however, the fuel cell module 100 along with the casing 160 should be located under the laptop PC 200, as shown in FIG. 3*d*. As shown in the figure, the laptop PC 200 is in an open position, showing a display panel 205 on the display section 204, and a keyboard 207 on the data processing section 206.

Figure 5:
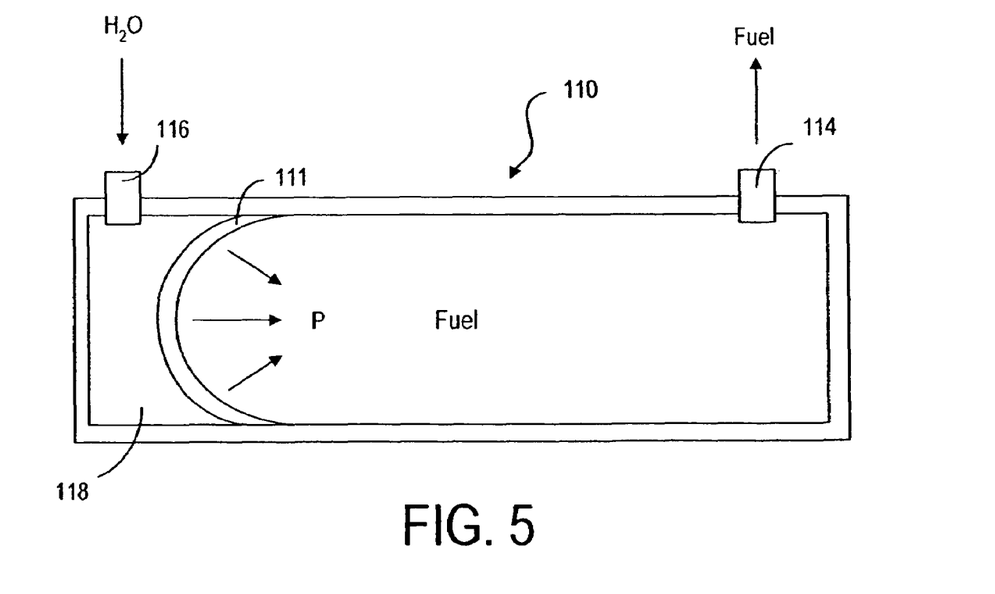
FIG. 5 is a cross sectional view of the fuel replenishing unit and the fuel bag disposed therein.

Advantageously, the fuel replenishing unit 110 includes a fuel bag 111 for storing the liquid methanol. The fuel bag can be seen in the cutout view of the fuel replenishing unit 110 in FIG. 4 and the cross sectional view in FIG. 5. As illustrated in FIG. 5, the fuel bag 111 is contractible such that its contraction pressure can be used to push the liquid methanol to the fuel cell 120 through a safety valve 114. The compartment 118 outside the contractible fuel bag 111 can be used to store the water produced by the fuel cell. This byproduct is delivered through a nozzle 116 by the channel 150 (see FIG. 4).

Figure 6A:
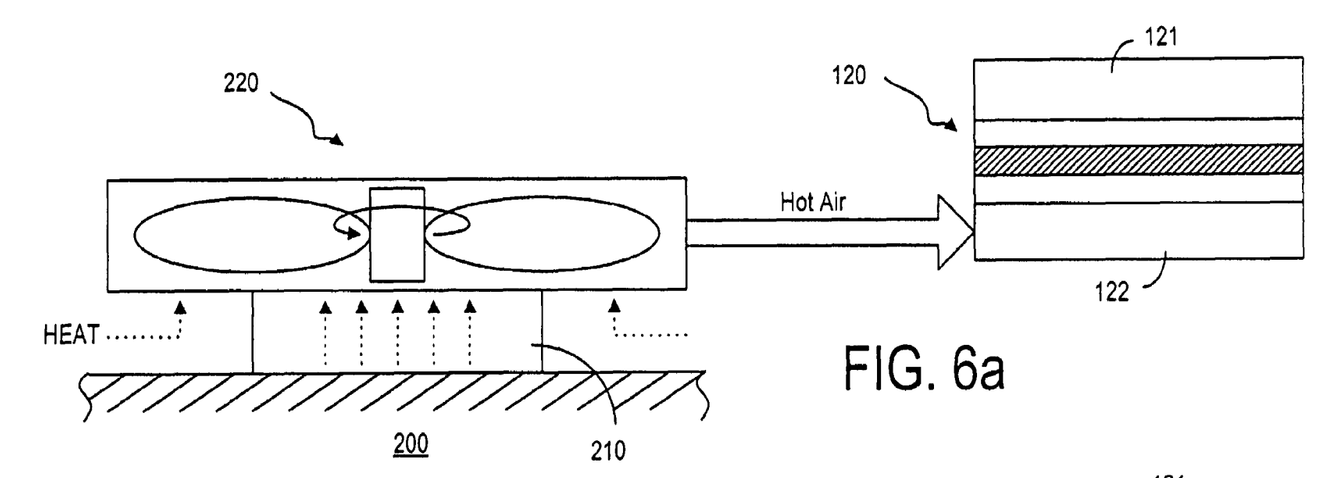
FIG. 6a is a schematic representation showing a fan being used to direct the hot air from a heat-sink to the cathode side of a fuel cell.
Figure 6B:
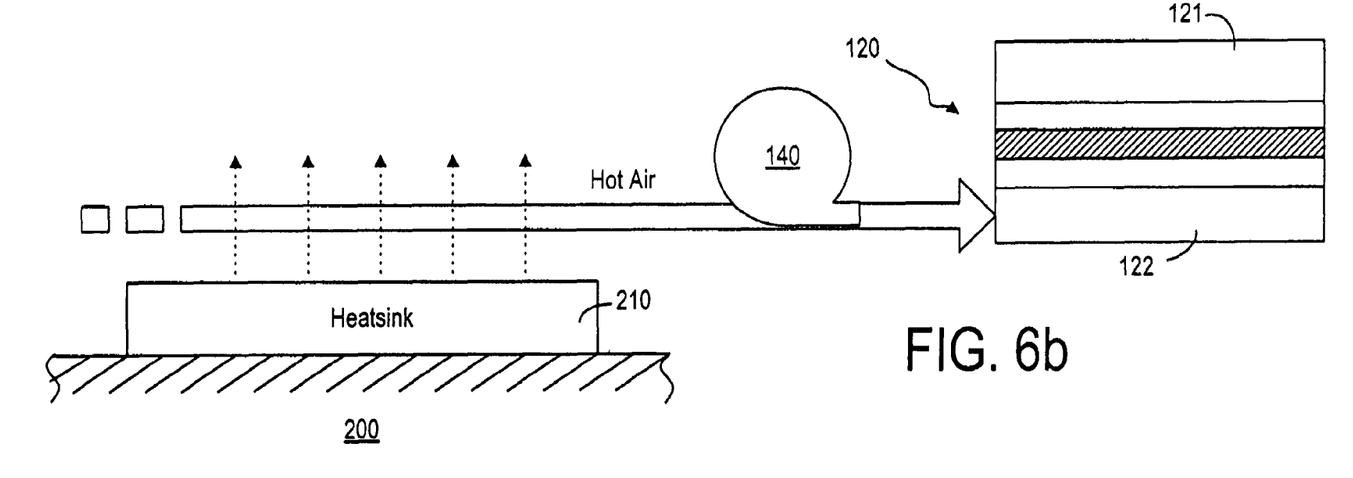
FIG. 6b is a schematic representation showing a pump being used to direct hot air from the interior of a portable PC to the cathode side of a fuel cell
Figure 6C:
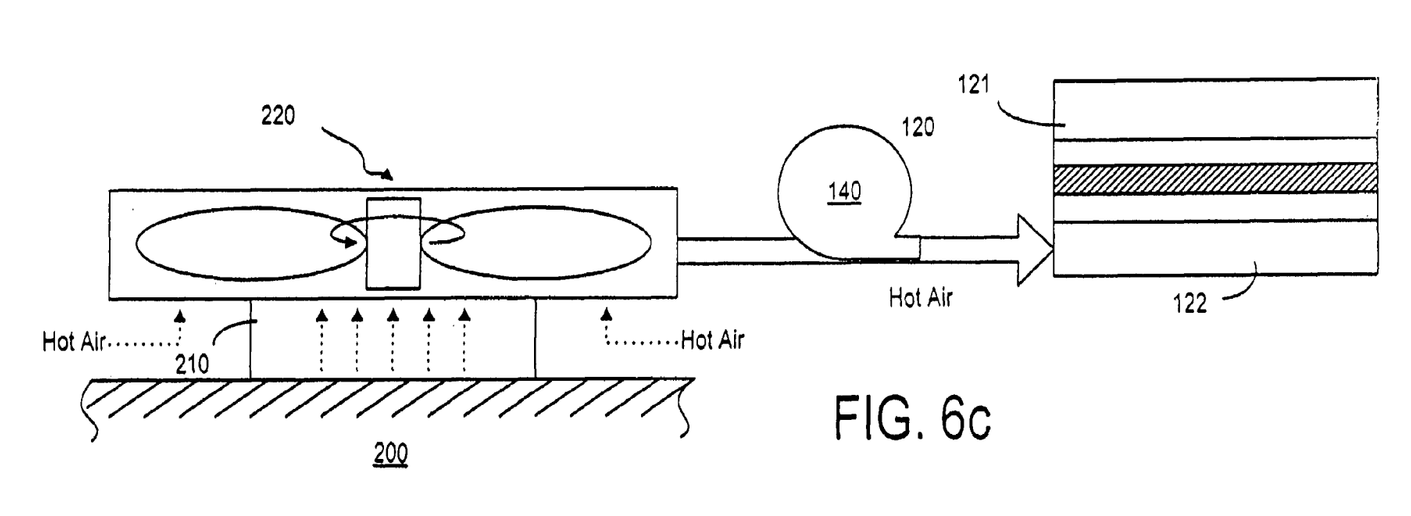
FIG. 6c is a schematic representation showing a pump in combination with a fan being used to direct hot air from the interior of a portable PC to the cathode side of a fuel cell.

While the liquid methanol from the replenishing unit 110 can be advantageously heated in the heat exchanger 130 as shown in FIG. 2*b*, the air needed for the cathodic reaction in the fuel cell 120 can be heated by other means as well. For example, the air to be fed to the cathode side 122 of the fuel cell 120 can be supplied by the fan 220, as shown in FIG. 6*a*. Heated air is generally available around the CPU heat-sink 210 and other heat producing components, such as the fan 220. Thus, the air pump 140 can also be used to supply heated air to the cathode side 122 of the fuel cell 120, as shown in FIG. 6*b*. The air pump 140 can be used in combination with the fan 220 to deliver heated air to the cathode side 122 of the fuel cell 120, as shown in FIG. 6*c*.

Figure 7A:
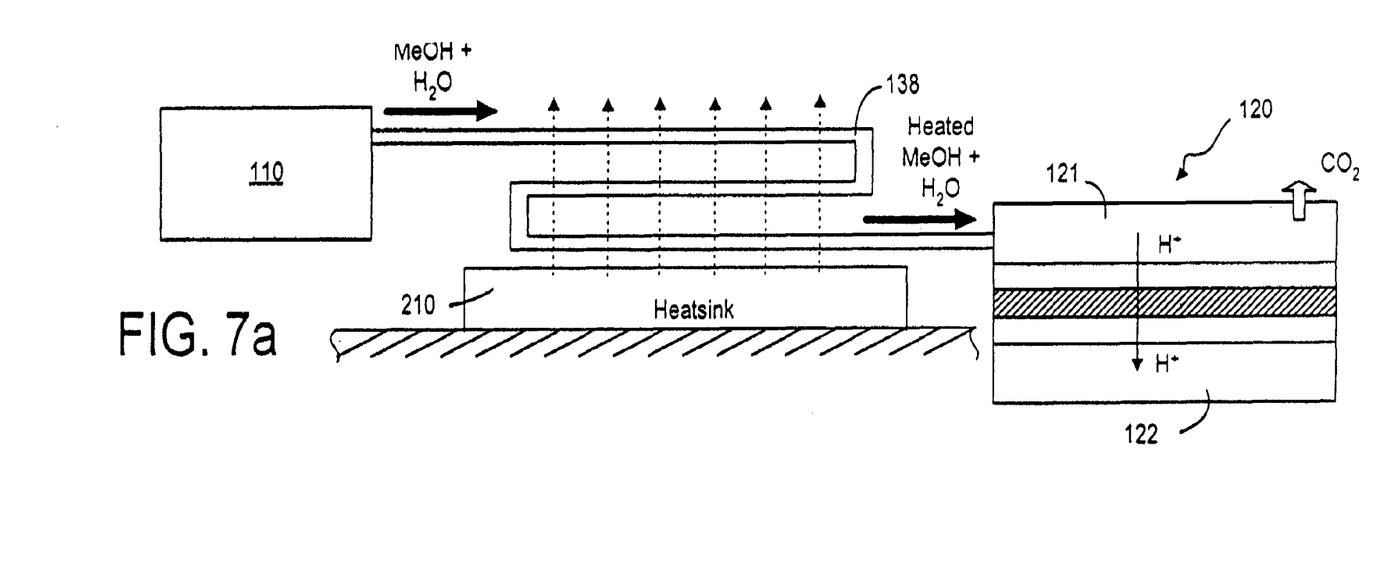
FIG. 7a is a schematic representation showing a fuel conduit being disposed on top of a heat-sink to be heated by convection and radiation.
Figure 7B:
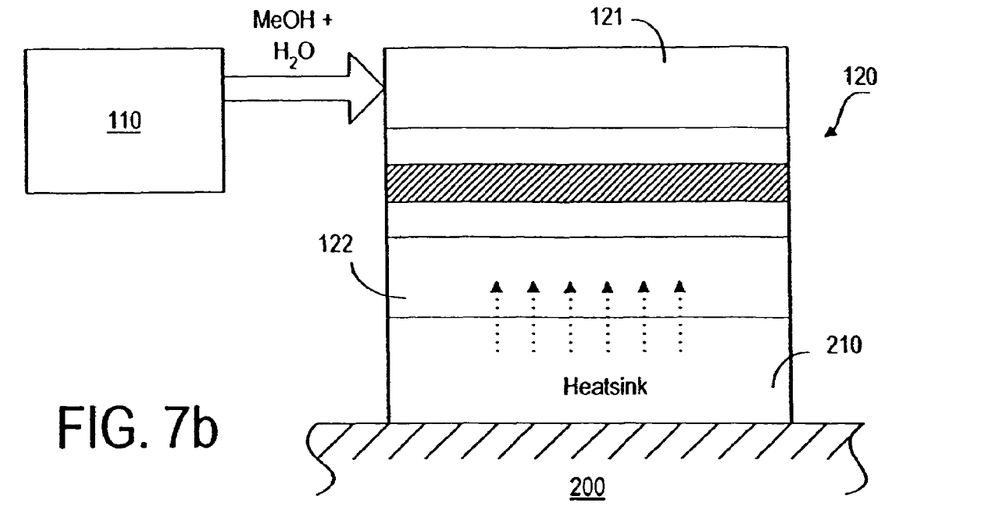
FIG. 7b is a schematic representation showing the fuel cell being disposed on a heat-sink to be heated by heat conduction.
Figure 7C:
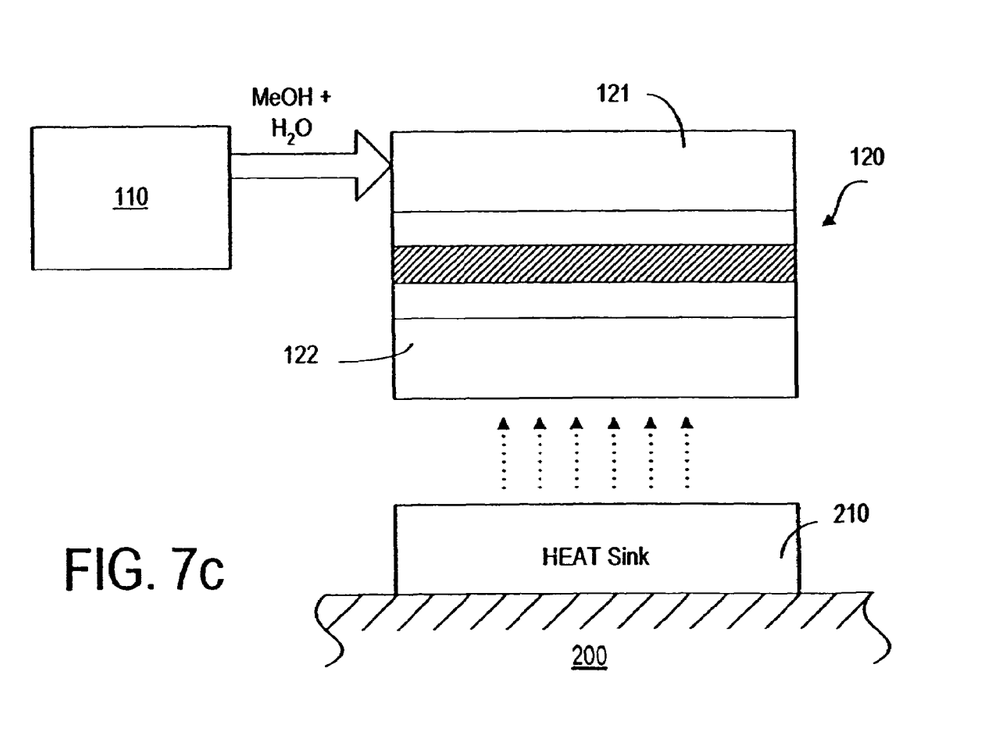
FIG. 7c is a schematic representation showing a fuel cell being disposed above a heat-sink to be heated by radiation.

Preferably, the liquid methanol is heated by conduction in a heat exchanger as shown in FIG. 2*b*. However, the liquid methanol can also be heated by radiation and convection. As shown in FIG. 7*a*, a folded tubing 138 can be placed on top of the heat-sink 210 for heating the liquid methanol inside the tubing. Alternatively, at least a part of the fuel cell 120 can be placed directly on top of the heat-sink 210 so as to allow heat to be transferred from the heat-sink to the fuel cell by conduction, as shown in FIG. 7*b*. It is also possible to place the fuel cell 120 above the heat-sink 210 so that the fuel cell 120 can be heated by radiation and convention.

Figure 8:
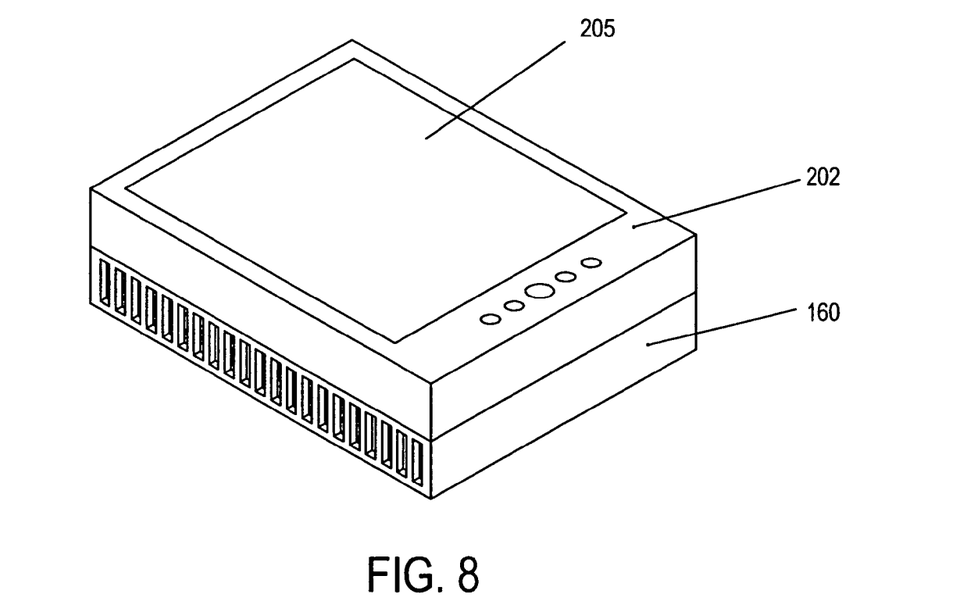
FIG. 8 is a schematic representation showing an arrangement of a fuel cell for use with a tablet PC.

The fuel replenishing unit 110, including the various heating components, can be used to supply electrical power to other portable electronic devices, such as a tablet PC 202 and the like. As shown in FIG. 8, the display section and the data processing section can be physically integrated. It is possible to place the fuel cell below the tablet PC 202, for example. The placement of heat-sink 210, the fan 220, the air pump 140, the heat exchanger 130 and the casing 160 may be substantially the same as the placement 3*a*–3*c*, and 6*a*–7*c*. However, the placement of such components can be different. Nevertheless, the method of using the heat generated by the CPU and other components to improve the operating efficiency of the fuel cell is still applicable.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of improving operating efficiency of a fuel cell for use in a portable electronic device, the fuel cell comprising:
    a cell compartment for containing a liquid fuel component; and
    a fuel activation unit disposed adjacent to the cell compartment for activating the liquid fuel component in order to generate electricity for use at least in the portable electronic device, wherein the fuel cell is operatively connected to a fuel replenishing unit via a connecting conduit, said method comprising:
    extracting heat from a part of the portable electronic device;
    heating at least part of the liquid fuel component in the connecting conduit using the extracted heat for providing a heated fuel part; and
    causing the heated fuel part to engage with the fuel activation unit in the cell compartment for activation so as to enhance efficiency of the activation in the fuel activation unit.

2. The method of claim 1, wherein the fuel cell further comprises:
    a further cell compartment for containing a further fuel component, the further cell compartment disposed adjacent to the fuel activation unit on a different side from the fuel cell compartment, said method further comprising the steps of:
    heating at least part of the further fuel component for providing a further heated fuel part; and
    causing the further heated fuel part to engage with fuel activation unit in the further cell compartment.

3. The method of claim 2, wherein the portable electronic device comprises at least one electronic component which generates heat, and a heat removal device disposed in relation to the electronic component for channeling at least part of the heat away from the electronic component at least to the connecting conduit, and wherein the heat channeled away by the heat removal device is used in said heating.

4. The method of claim 2, wherein the activation unit comprises a membrane electrode assembly, the liquid fuel component comprises substantially a mixture of alcohol and water, and the further fuel component comprises substantially air.

5. The method of claim 1, wherein the portable electronic device comprises at least one electronic component which generates heat, and wherein said heating uses the heat generated by said at least one electronic component.

6. The method of claim 5, wherein the portable electronic device comprises a heat removal device disposed in relation to the electronic component for channeling at least part of the heat away from the electronic component, and wherein the heat channeled away by the heat removal device is used in said heating.

7. The method of claim 6, wherein the heat removal device comprises a heat-sink.

8. The method of claim 6, wherein the heat removal device comprises an air blower.

9. The method of claim 5, wherein said at least one electronic component in the portable electronic device is a CPU.

10. The method of claim 9, wherein the heat removal device comprises a heat-sink, which is disposed in contact to the CPU in order to channel away the heat produced by the CPU.

11. The method of claim 10, wherein the heat removal device further comprises an air blower disposed in the proximity of the heat-sink for further channeling away the heat produced by the CPU.

12. The method of claim 1, wherein the liquid fuel component comprises substantially a mixture of alcohol and water.

13. The method of claim 12, wherein the fuel cell comprises a direct methanol fuel cell and the alcohol comprises substantially methanol.

14. The method of claim 12, wherein the activation unit comprises a membrane electrode assembly for activating the alcohol in the cell compartment.

15. The method of claim 14, wherein the portable electronic device comprises at least a CPU which generates heat, and a heat removal device positioned in relation to the CPU to channel away the heat generated by the CPU, and wherein the fuel cell also produces water as a byproduct in the further cell compartment, said method further comprising the step of removing at least a part of the byproduct water away from the further cell compartment by using the heat channeled away by the heat removal device.

16. The method of claim 12, wherein the heated fuel part has a temperature substantially in a temperature range of 50° C. to 85° C.

17. The method of claim 1, wherein the portable electronic device comprises at least one electronic component which generates heat, and a heat removal device disposed in relation to the electronic component for channeling at least part of the heat away from the electronic component, and wherein at least part of the fuel conduit is disposed in the proximity of the heat removal device so that said part of the liquid fuel component is heated through the conduit using the heat channeled away by the heat removal device.

18. The method of claim 17, wherein at least a part of the fuel conduit is disposed in a heat exchanger, which is disposed in the proximity of the heat removal device so as to allow the heat channeled away by the heat removal device to heat said part of the fuel component in the fuel conduit via the heat exchanger.

19. The method of claim 18 wherein the heat exchanger is disposed in contact to the heat removal device so as to allow the heat channeled away by the heat removal device to heat the heat exchanger by way of conduction.

20. The method of claim 18, wherein the heat exchanger is placed adjacent to the heat removal device so as to allow the heat channeled away by the heat removal device to heat the heat exchanger by way of radiation or convection.

21. The method of claim 1, wherein the portable electronic device comprises a notebook computer.

22. The method of claim 1, wherein the portable electronic device comprises a tablet personal computer.

* * * * *